Aug. 10, 1965 E. DAVIES ETAL 3,200,195

TELEVISION SYSTEMS

Filed May 12, 1961

2 Sheets-Sheet 1

INVENTORS
Eric Davies and
Anthony Norman Heightman
BY Baldwin & Wight
ATTORNEYS

INVENTORS
Eric Davies and
Anthony Norman Heightman
BY Baldwin & Wight
ATTORNEYS 3,200,195
TELEVISION SYSTEMS
Eric Davies, Danbury, and Anthony Norman Heightman, Great Baddow, England, assignors to The Marconi Company Limited, a British company
Filed May 12, 1961, Ser. No. 109,724
Claims priority, application Great Britain, Oct. 26, 1960, 36,743/60
21 Claims. (Cl. 178—6.8)

This invention relates to television systems and has for its object to provide improved television systems which will require a narrower bandwidth for the transmitted signals than does a comparable known present day system having the same number of picture elements in the finally reproduced picture.

According to this invention in its broadest aspect a television system comprises, at a transmitter, means for transmitting during any one television field, signals corresponding to separate spaced picture elements and, at a co-operating receiver, means for receiving the transmitted signals, means for reproducing the received signals as separate spaced reproduced picture elements in the television field to which they are appropriate, means for deriving from the received signals further signals which are in predetermined spaced time relationship with the received signals and of varying values dependent on the varying values of said received signals, and means for reproducing said further signals as further separate space reproduced picture elements in the same television field in the spaces between the aforesaid spaced reproducing picture elements.

In one way of carrying out the invention as applied to a so-called sequential line television system, i.e., a system wherein the number of fields per second is the same as the number of frames, the lines of each field exploring the whole picture area, the scanning spot at the transmitter is caused to oscillate, during each line period excursion, between two successive lines so that odd numbered picture element signals correspond to spaced picture elements in one of said two lines and even numbered picture element signals correspond to spaced picture elements in the other of said two lines, the said spaced picture elements in each of said lines being spaced by a picture element. Preferably the scanning spot oscillation is at a frequency which is approximately equal to the maximum modulation frequency of the system and is an odd harmonic of half the field frequency. It may be produced by a wobble frequency oscillation source connected to produce auxiliary deflection of the scanning spot in the television camera tube in the field direction. Preferably the wobble oscillation waveform is rectangular though other waveforms, e.g., sinusoidal or triangular, may be used. In one form of receiver for co-operation with a transmitter as just described the received signals are applied to modulate a first reproducing scanning spot which is deflected in line and field synchronism with the scanning spot at the transmitter and is also wobbled in synchronism with and in phase with the wobble of the said spot at the transmitter and with the same wobble amplitude and the said received signals are also delayed by the time of one picture element and combined with themselves with the two combined signals each at half strength, the resultant combination signals being applied to modulate a second reproducing spot which is deflected in line and field synchronism with the scanning spot at the transmitter and is also wobbled at the same frequency as the wobble of the said spot at the transmitter but in phase opposition thereto. The two reproducing scanning spots may be the scanning spots in two separate reproducer tubes, each reproducing its own picture, the two reproduced pictures being optically superimposed by suitable known optical projection systems to produce a composite picture for viewing. Alternatively the two reproducing scanning spots may be produced by two electron guns or (what is, from the viewpoint of the invention, the equivalent) a split electron gun system, producing two independently deflectable cathode ray beams, the two spots scanning the same fluorescent screen to produce a composite picture of the same nature as the optically projected composite picture obtained in the case where there are two reproducer tubes. Instead of modulating the second reproducing spot by combination signal obtained by combining, at half strength, received signals delayed by the time of one picture element with undelayed received signals, the second reproducing spot may be modulated by combination signals obtained by delaying the received signals twice, each time by the time of one picture element, the undelayed received signals at one third strength being combined with single delayed received signals also at one third strength and twice delayed received signals also at one third strength. As before the component pictures, one produced by the first reproducing spot and the other by the second reproducing spot, may be produced in separate tubes and superimposed optically or they may be produced on the same screen by a tube having either two electron guns or a split gun system. It will be seen, however, that in this modified receiver as so far described the raster produced by the second reproducing spot will be displaced in the line directionaly one picture element and, to avoid this, the signals fed to modulate the first reproducing spot should be delayed by the time of one picture element or, alternatively when combining the two rasters to produce the composite picture for viewing, one of them should be offset in the line direction by one picture element. Where two reproducer tubes are employed the off-setting may be conveniently effected in the optical system. Where a single reproducer tube is employed the off-setting may be conveniently effected by adding a fixed component of deflection in the line direction to the deflection applied to one scanning cathode ray beam.

The invention is, of course, equally applicable to so-called interlaced line television systems, i.e., to systems, such as are now in general use, where the number of fields per second is an integral multiple (normally two) of the number of frames per second, the lines of each field falling in spaces between the lines of the other fields. For simplicity of description the usual double interlacing will be assumed, i.e., the case where there are twice as many fields as there are frames, the lines of each field alternating, in the final picture, with the lines of the next field. In one way of carrying out the invention as applied to such a system, the scanning spot at the transmitter is caused to oscillate, during each line period excursion of a field, either with an amplitude such as to swing it back and forth between two successive lines of that field or with half that amplitude. The scanning spot oscillation frequency is preferably approximately equal to the maximum modulation frequency of the system and is an odd harmonic of one quarter of the field frequency and, as before, it may be produced by a wobble frequency oscillation source which is preferably of rectangular waveform though it may be of other waveforms, e.g., triangular or sinusoidal. A receiver for co-operation with either of these forms of double interlaced system transmitters in accordance with this invention may be of any of forms above described as suitable for co-operation with a sequential line transmitter in accordance with the invention except, of course, that they will be double interlaced and the wobble amplitude will be, in both cases, equal to the successive line spacing in one field though in the one case, the actual amplitude will be twice that in the other case.

In the single reproducer tube receivers in accordance with the invention so far described the tube has either two guns to produce two beams or a split electron gun giving two beams, successive lines being traced by different beams. It is possible, however, to produce results fairly closely equivalent to that produced by a two-beam tube by means of a single beam tube by subjecting the single beam to an auxiliary wobble deflection (this auxiliary wobble frequency may be a high frequency or it may be, for example, of the same frequency as the main wobble frequency or a selected harmonic thereof) of amplitude corresponding to the wobble deflection employed at the transmitter and applying suitable modulating signals to modulate the beam at substantially only those times when it is at the top of the "crests" and the bottoms of the "valleys" of the auxiliary wobble. In essence, a receiver of this nature comprises a reproducer tube, means for producing a single electron beam to scan a fluorescent screen in said tube, means for deflecting said beam at a line and field frequency synchronised with the corresponding frequencies at a co-operating transmitter, means for subjecting said beam to an auxiliary wobble deflection in the field direction with an amplitude corresponding to the wobble deflection employed at said co-operating transmitter, means for producing, from received signals, combination signals compounded of received signals and delayed received signals, switch means actuated at the auxiliary wobble frequency for successively applying one or other of two signals present at two terminals to modulate said electron beam at times when said auxiliary wobble is at or near the limits of the wobble excursion and means for applying received signals and said combination signals to said two terminals, said last mentioned means including change-over switch means actuated at a frequency synchronised with the wobble frequency employed at the transmitter, for successively supplying first received signals to one and combination signals to the other of said terminals and then combination signals to said one and received signals to said other of said terminals, and so on . . . with successively changed-over feed connections to said terminals. The combination signals may be produced in any of the ways already set forth in connection with the previously described forms of receiver in accordance with this invention.

The invention is illustrated in and further explained in connection with the accompanying schematic and graphical drawings, in which like references denote like parts throughout and in which:

FIGURE 1 is a block diagram of a television transmitter in accordance with this invention;

FIGURES 2, 3, 4, 8, 9A, 9B, and 10 are explanatory diagrams relating to the various wobbled scanning operations taking place in the television systems of the invention;

Figure 1:
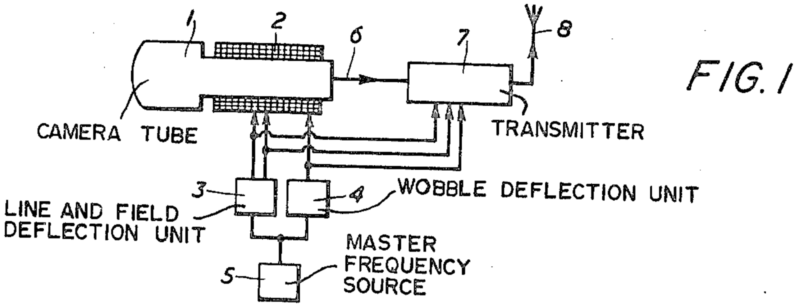

Referring to FIGURE 1, this shows so far as is necessary to an understanding of the invention and in highly simplified block diagram manner, one form of transmitter in accordance with this invention. In FIGURE 1 a television camera tube is indicated at 1 and electromagnetic deflection coil equipment therefor is indicated by the cross-hatched coil system 2. This system comprises the usual focusing, line deflection, and field deflection coils and also a wobble coil for producing a wobble deflection in the field direction. Block 3 represents the usual line and field deflection unit and 4 is a wobble deflection unit adapted to produce a rectangular wobble wave form at the highest modulation frequency, i.e., the picture element frequency. Units 3 and 4 are represented as driven or controlled by a master frequency source 5 of frequency suitably related to the line, field and wobble frequencies. These three frequencies, together with the video signals provided by the tube 1 on the lead 6 are supplied to a television radio transmitting unit represented by block 7 and broadcast by an aerial 8.

Figure 2:
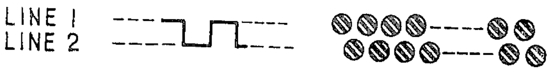

The transmitter shown in FIGURE 1 may be either of the sequential line type or of the interlaced type. The simplest case to consider is that of sequential line operation in which case, of course, the field frequency from unit 3 is the frame or picture repetition frequency and the line deflection signals from the said unit 3 are such that successive lines are immediately beneath one another. In this case the amplitude of the applied wobble from unit 4 is such that the scanning spot during any one period of line direction deflection alternates between that line and the next one so that successive picture elements taken off by the camera tube and transmitted are taken from different lines, the picture elements in any one line being spaced apart by one element period and alternating with similarly spaced elements in the next line. This will be clear from FIGURE 2, the left hand part of which represents the path of the scanning spot during one line excursion and the right hand part of which represents, by heavily cross hatched dots, the picture elements taken off and transmitted during that line excursion. As will be apparent the actual transmitted picture element frequency is one half that of an otherwise equivalent ordinary sequential line transmitter.

Figure 3:
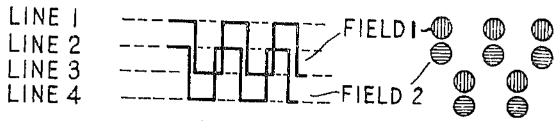
Figure 4:
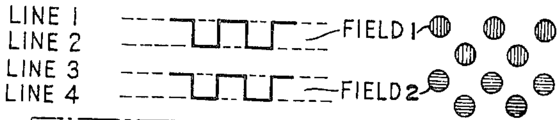

FIGURES 3 and 4 show two ways in which the transmitter of FIGURE 1 could be operated in double interlaced operation. In both these cases, of course, the field frequency is twice the frame or picture repetition frequency and the line deflection is such that the lines of any field are spaced and the lines of the next field fall in the inter-line spaces of the preceding field in the customary well known way. FIGURES 3 and 4 are representations of the same nature as FIGURE 2. In FIGURE 3, lines 1 and 3 are successive lines in an odd field and lines 2 and 4 are successive lines in the next even field. In FIGURE 4, lines 1 and 2 are successive in an odd field and lines 3 and 4 are successive in the next even field. As will be seen the wobble amplitude in FIGURE 4 is half what it is in FIGURE 3. In both figures vertically hatched spots represent picture elements in the lines of the odd field and horizontally hatched elements represent picture elements in the lines of the even field. In the interests of clarity of drawing the two "rectangular wave-forms" shown in FIGURE 3 are represented as though they were (as, of course, they are not) slightly displaced or staggered laterally so that each "wave-form" can be shown separately.

Figure 5:
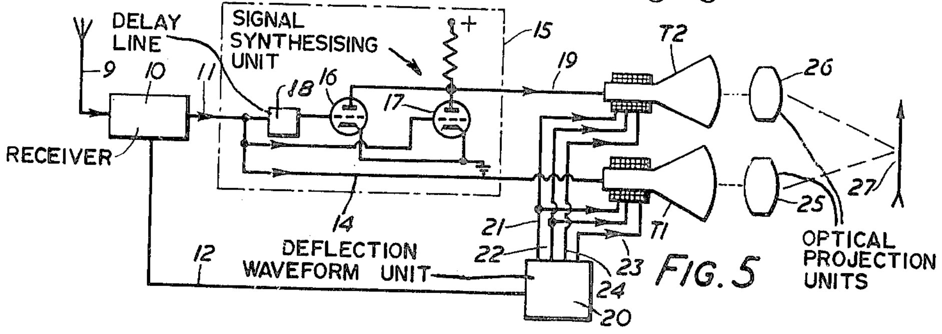
FIGURE 5 is a block diagram of a television receiver in accordance with the invention.

FIGURE 5 is a simplified block diagram representation of one form of receiver equipment in accordance with the invention and adapted to co-operate with a transmitter as illustrated by FIGURE 1. Referring to FIGURE 5, a receiving aerial 9 feeds into a receiver 10 which derives from the received signals, a composite signal waveform including video signals and line, field, and wobble frequency synchronising signals. The video signals appear on lead 11 and synchronising signals on lead 12. The video signals are fed direct over lead 14 to modulate the scanning electron beam in one cathode ray reproducer tube T1. The said video signals are also fed to what may be termed a signal synthesising unit within the chain line block 15. This unit comprises two valves 16 and 17, each adjusted to give an output of half the strength of the signal on lead 14. The valve 16 is fed via a delay line 18 having a delay time equal to one picture element period with video signals on lead 11 and the valve 17 is fed with signals direct from lead 11. The outputs from the two valves 16 and 17 are combined to produce resultant combination signals on the lead 19 and these signals are fed to modulate the scanning electron beam in a second reproducer cathode ray tube T2.

Figure 8:
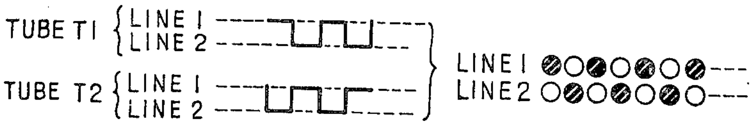

Assuming for the moment that the transmitter with which the equipment illustrated by FIGURE 5 is to co-operate is of the sequential line type, the electron beams in the tubes T1 and T2 are subjected to sequential line and field deflections in synchronism with the corresponding deflections at the transmitter by line and field deflecting waveforms produced in well known way by apparatus in a synchronised deflection waveform unit represented by block 20, these waveforms being fed to the tubes over leads 21 and 22. In addition the unit 20 also produces two rectangular waveform wobble frequency outputs of the same frequency as that used at the transmitter and both of an amplitude equal to the inter-line spacing, also as at the transmitter. One of these outputs is in phase with the wobble frequency at the transmitter and the other is at 180° phase displacement with respect thereto. The in-phase wobble output is fed to the deflection coil unit of tube T1 over lead 23 and the phase opposition wobble output is fed over lead 24 to wobble the beam in tube T2. The wobble waveforms applied to the tubes T1 and T2 are represented in the left hand part of FIGURE 8 (between the oppositely facing curly brackets) in the same manner as that adopted in the left hand part of FIGURE 2. Each tube T1 or T2 will produce on its fluorescent screen its own picture, that in tube T1 being produced in a direct fashion by the actually received video signals and that in tube T2 by combination signals derived from the actually received video signals by the unit 15. These two pictures are accurately superimposed by suitable optical means represented diagrammatically by optical projection units 25 and 26 to provide a composite picture diagrammatically represented by the arrow 27. As will be seen the composite picture will be composed of picture elements (actually received) from tube T1 interspersed with picture elements (reconstituted) from tube T2. This is illustrated by the right hand part of FIGURE 8, in which the picture elements in two successive sequential lines are represented diagrammatically, those from tube T1 being shown by heavily hatched circles and those from tube T2 being shown by clear circles.

Figure 6:
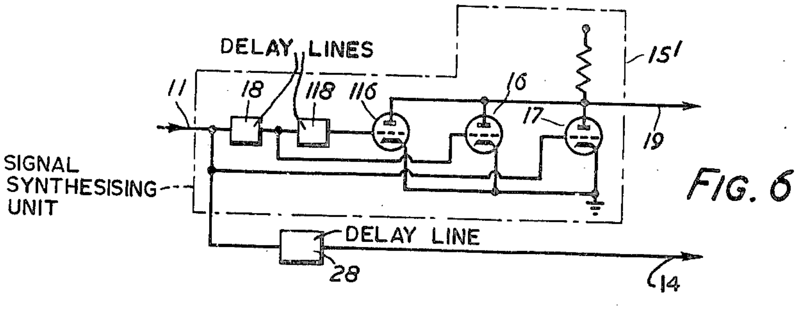
FIGURE 6 shows an alternative form of the signal synthesising unit for the receiver.

The unit 15 may take other forms, for example that shown in FIGURE 6 within the chain line block 15′. Here the combination signals on lead 19 for feeding to tube T2 are obtained by combining the outputs from three valves 17, 16 and 116 each adjusted to give ⅓ strength output (instead of ½ strength output as in the case of the valves in unit 15 of FIGURE 5). The valve 17 is fed with video signals direct from lead 11; the valve 16 is fed with those signals delayed by one picture element period by the delay line 18; and the valve 116 is fed with those signals delayed by two picture element periods by the delay line 18 and an additional identical delay line 118. Because of the delays now provided in producing the combination signals on lead 19, a delay line 28 is interposed in the lead 14 to the tube T1. In place of inserting the delay line 28 as described, the optical superimposition means 25, 26 may be so arranged that the pictures produced by the tubes T1 and T2 are optically superimposed with a relative lateral displacement, in the line direction, equal to one picture element.

Figure 7:
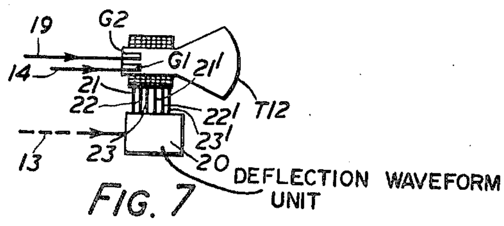
FIGURE 7 shows a modification of the receiver of FIGURE 5, utilizing a reproducer tube which has either two electron guns or else a split gun.

It is not necessary to use two tubes T1 and T2 and optically to superimpose their pictures, it being possible to employ instead a two-gun reproducer tube or a tube having a so-called split gun, adapted to produce two independently deflectable electron beams. Such a modification is illustrated, so far as is necessary to an understanding thereof, by FIGURE 7. Here a two gun tube T12 is represented diagrammatically, the two guns being indicated at G1 and G2. Gun G1 is fed over lead 14 with video signals actually received and gun G2 is fed over lead 19 with combination signals from a unit such as 15 of FIGURE 5 or 15′ of FIGURE 6. The deflection coil unit of the tube T12 includes deflection coil parts fed from unit 20 with deflection waveforms fed over leads 21, 22, and 23 for providing line, field, and in-phase wobble deflection of the beam from gun G1 and with deflection waveforms fed over leads 21′, 22′, and 23′ for providing line, field, and phase opposition wobble deflection of the beam from gun G2.

Figure 9A:
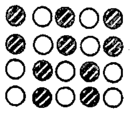
Figure 9B:
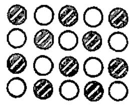

As already stated the transmitter of FIGURE 1 may be of the interlaced type with applied wobble as described with reference to FIGURE 3 or as described with reference to FIGURE 4. In such a case the line and field deflection waveforms from unit 20 will, of course, be such as to produce interlacing corresponding to that at the transmitter and the wobble deflecting waveforms from the said unit 20 will correspond in amplitude to the wobble at the transmitter, there being, as before, two phase opposed wobble waveforms from unit 20. The resulting composite picture, whether produced by superimposition of pictures from two tubes as in FIGURE 5, or by a double beam tube as in FIGURE 7, will be of the nature illustrated by FIGURE 9A if the transmitter operates in accordance with FIGURE 3, or by FIGURE 9B if the transmitter operates in accordance with FIGURE 4. In both these FIGURES 9A and 9B heavily hatched dots represent picture elements due to actually received video signals and clear circles represent picture elements due to combination or re-constituted signals.

Referring again to FIGURE 8, it will be seen that, if, as is preferred, the wobble frequency is an odd harmonic of half the field frequency then, if the picture elements reproduced in one sequential line field are as represented in FIGURE 8, the next sequential line field will be the same as FIGURE 8 except that the black and white circles will change places. Similarly in the interlaced cases represented by FIGURES 9A and 9B, if the wobble frequency is an odd harmonic of one quarter the field frequency, the black and white circles will interchange in the case of FIGURE 9A or FIGURE 9B after two fields.

Figures 10, 11:
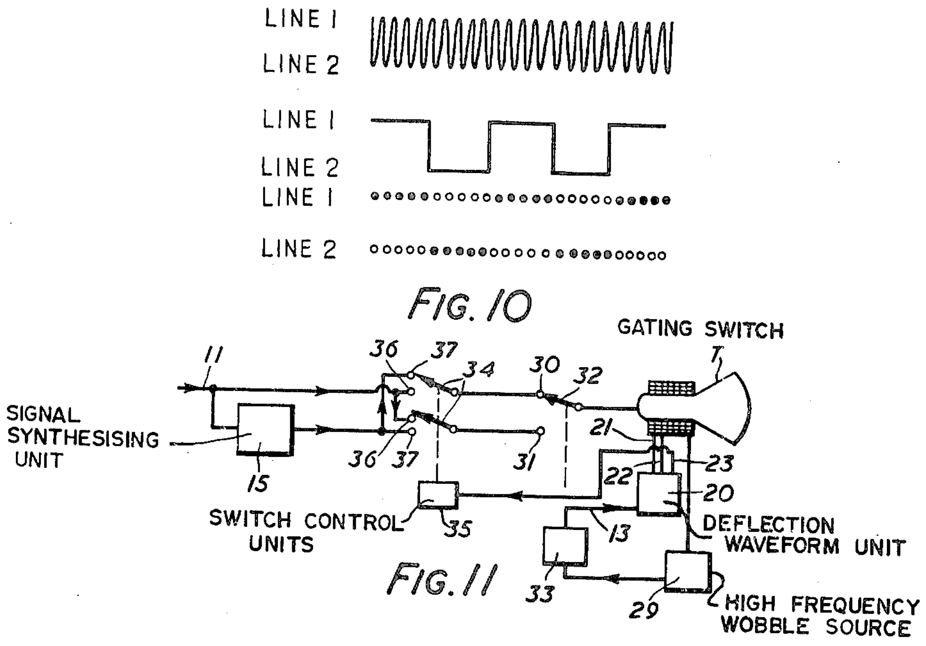
FIGURE 11 is a block diagram of another embodiment of a television receiver in accordance with this invention.

FIGURES 10 and 11 illustrate a modification using only one single beam tube which is subjected to an additional, relatively high frequency wobble deflection so as to cause the single beam to wobble at high speed between two successive lines. In FIGURE 11 the single beam tube is represented at T. The deflection coil unit of this tube is fed with line and field deflection waveforms from unit 20 in synchronism with the corresponding deflections at the co-operating transmitter. The leads over which these deflecting waveforms are applied are marked 21 and 22 respectively. In addition the beam is also subjected to a high frequency wobble deflection in the field direction of the same amplitude as the rectangular wobble waveform at the transmitter and supplied by a high frequency wobble source 29. The high frequency wobble wavefrom is represented by the uppermost wave in FIGURE 10 and the rectangular wobble wavefrom used at the co-operating transmitter is represented by the middle waveform in that figure. The modulating signals fed to the beam of the tube are taken alternatively from two terminals 30, 31 by means of a gating switch 32 (in practice an electronic switch, though, for simplicity of drawing, not shown as such) which is changed over at the high wobble frequency by means of a switch control unit represented by a block 33 actuated by source 29. The arrangement is such that the switch 32 is on contact 30 only when the high frequency wobble waveform is at and near a "crest" of the wave and is on contact 31 only when said waveform is at and near a "valley" of the wave. The terminals 30 and 31 are fed from the two arms of a double-arm change-over switch 34 (also in practice an electronic switch) which is changed over in synchronism with the rectangular, wobble waveform at the transmitter by means of a switch control unit 35. The switch 34 has two pairs 36 and 37 of contacts, of which the pair 36 is fed with received video signals from lead 11 and the pair 37 is fed with reconstituted or combination signals derived from the received video signals by a reconstituting unit marked 15 which may be as shown at 15 in FIGURE 5 or 15' in FIGURE 6. When the switch 34 is in the position shown contact 30 will be fed with combination signals and contact 31 will be fed with received video signals. When the switch 34 is in its other position the signals fed to the contacts 30 and 31 will be changed over. The resultant picture on the screen of the tube will be as represented, for two successive lines, at the bottom of FIGURE 10 where the small black dots are due to receiver video signals and the small circles are due to combination signals. It will be appreciated that in the showing of this part of FIGURE 10 each succession of small black dots (or small circles) in a line occupies the time of one picture element.

Wobbling of a scanning spot in television is, of course, well known per se for the purpose of concealing or obscuring, so far as is possible, the line structure of a television picture. The known spot wobbling proposals are, however, quite different from those proposed for this invention and for a quite different purpose.

We claim:

1. A television system comprising: a transmitter having means for transmitting, during any one television field, signals corresponding to separate spaced picture elements, said transmitting means including wobble means for causing the scanning spot to oscillate during each line period excursion between two successive lines in the field so that the transmitted signals correspond alternately to spaced picture elements in the two lines; and a co-operating receiver including means for receiving the transmitted signals, means for reproducing the received signals as separate spaced reproduced picture elements in the television field to which they are appropriate, synthesising means for deriving from successive received signals further signals of varying values dependent upon the varying values of said received signals, and means for reproducing said further signals as further separate spaced reproduced picture elements in the same television field in the spaces between the aforesaid spaced reproduced picture elements.

2. A television system as claimed in claim 1 wherein said wobble means includes means for causing scanning spot oscillation at a frequency which is approximately equal to the maximum modulation frequency of the system and which is an odd harmonic of half the field frequency.

3. A television system as claimed in claim 1 wherein said wobble means includes means for generating a rectangular waveform.

4. A television system in accordance with claim 1 wherein said transmitting means includes means for providing double interlaced deflection of the transmitter scanning spot and means for oscillating the transmitter scanning spot during each line period excursion of a field with half the amplitude necessary to move it back and forth between two successive lines of that field.

5. A televison system as claimed in claim 1, in which said means for reproducing the received signals and said means for reproducing the further signals comprise a reproducer tube, means for producing a single electron beam to scan a fluorescent screen in said tube, means for deflecting said beam at a line and field frequency synchronised with the corresponding frequencies at said transmitter, means for subjecting said beam to an auxiliary wobble deflection in the field direction with an amplitude corresponding to the wobble deflection employed at said transmitter, means for producing from received signals combination signals compounded of received signals and delayed received signals, switch means actuated at the auxiliary wobble frequency for successively applying one or other of two signals present at two terminals to modulate said electron beam at times when auxiliary wobble is at or near the limits of the wobble excursion and means for applying received signals and said combination signals to said two terminals, said last mentioned means including change-over switch means actuated at a frequency synchronised with the wobble frequency employed at the transmitter, for successively supplying first received signals to one and combination signals to the other of said terminals and then combination signals to said one and received signals to said other of said terminals, and so on, with successively changed-over feed connections to said terminals.

6. A television system in accordance with claim 1, wherein said transmitting means includes means for providing double interlaced deflection of the transmitter scanning spot and means for oscillating the transmitter scanning spot during each line period excursion of a field with an amplitude such as to move it back and forth between two successive lines of that field, and wherein said means for reproducing the received signals includes means for deflecting a first reproducing scanning spot in line and field synchronism with the scanning spot at the transmitter, first wobble means for oscillating said first reproducing scanning spot in synchronism with and in phase with the wobble of the scanning spot at the transmitter and with the same wobble amplitude which is equal to the successive line spacing in one field, and means for modulating said first reproducing scanning spot by the received signals delayed by the time of one picture element; said synthesising means comprises means for delaying the received signals twice, each delay equalling the time of one picture element, and means for combining the resultant single delayed signals and twice delayed signals with the undelayed received signals, each at one third strength, to produce resultant combination signals; and said means for reproducing the further signals comprises means for deflecting a second reproducing scanning spot in line and field synchronism with the scanning spot at the transmitter, second wobble means for oscillating said second reproducing scanning spot in synchronism with but in phase opposition to the wobble of the scanning spot at the transmitter and with the same wobble amplitude, and means for modulating said second reproducing scanning spot with said resultant combination signals.

7. A television system in accordance with claim 1, wherein said transmitting means includes means for providing double interlaced deflection of the transmitter scanning spot, there being two rasters for each picture transmitted, and means for oscillating the transmitter scanning spot during each line period excursion of a field with an amplitude such as to move it back and forth between two successive lines of that field, wherein said means for reproducing the received signals includes means for deflecting a first reproducing scanning spot in line and field synchronism with the scanning spot at the transmitter, first wobble means for oscillating said first reproducing scanning spot in synchronism with and in phase with the wobble of the scanning spot at the transmitter and with the same wobble amplitude which is equal to the successive line spacing in one field, and means for modulating said first reproducing scanning spot with the received signals; said synthesising means comprises means for delaying the received signals twice, each delay equalling the time of one picture element, and means for combining the resultant single delayed signals and twice delayed signals with the undelayed received signals, each at one third strength, to produce resultant combination signals; and said means for reproducing the further signals comprises means for deflecting a second reproducing scanning spot in line and field synchronism with the scanning spot at the transmitter, second wobble means for oscillating said second reproducing scanning spot in synchronism with but in phase opposition to the wobble of the scanning spot at the transmitter and with the same wobble amplitude, and means for modulating said second reproducing scanning spot with said resultant combination signals; and wherein means are provided for offsetting one of the two rasters which are combined to produce the composite picture in the line direction by one picture element.

8. A sequential line television system as claimed in claim 1, in which said means for reproducing the received signals includes means for deflecting a first reproducing scanning spot in line and field synchronism with the scanning spot at the transmitter, first wobble means for oscillating said first reproducing scanning spot in synchronism with and in phase with the wobble of the scanning spot at the transmitter and with the same wobble amplitude, means for delaying received signals by the time of one picture element, and means for modulating said first reproducing scanning spot by the received signals delayed by the time of one picture element; said synthesising means comprises means for delaying the received signals including means for producing two delayed signals, one delayed by a time equal to the time of one picture element and the other delayed by a time equal to the time of two picture elements and means for combining said two delayed signals with the undelayed received signals, each at one third strength, to produce resultant combination signals; and said means for reproducing the further signals comprises means for deflecting a second reproducing scanning spot in line and field synchronism with the scanning spot at the transmitter, second wobble means for oscillating said second reproducing scanning spot in synchronism with but in phase opposition to the wobble of the scanning spot at the transmitter, and means for modulating said second reproducing scanning spot with said resultant combination signals.

9. A sequential line television system as claimed in claim 1, in which said means for reproducing the received signals includes means for deflecting a first reproducing scanning spot in line and field synchronism with the scanning spot at the transmitter, first wobble means for oscillating said first reproducing scanning spot in synchronism with and in phase with the wobble of the scanning spot at the transmitter and with the same wobble amplitude, and means for modulating said first reproducing scanning spot by the received signals; said synthesising means comprises means for delaying the received signals including means for producing two delayed signals, one delayed by a time equal to the time of one picture element and the other delayed by a time equal to the time of two picture elements and means for combining said two delayed signals with the undelayed received signals, each at one third strength, to produce resultant combination signals; and said means for reproducing the further signals comprises means for deflecting a second reproducing scanning spot in line and field synchronism with the scanning spot at the transmitter, second wobble means for oscillating said second reproducing scanning spot in synchronism with but in phase opposition to the wobble of the scanning spot at the transmitter, means for modulating said second reproducing scanning spot with said resultant combination signals, and means for offsetting one of the two rasters which are combined to produce the composite picture in the line direction by one picture element.

10. A sequential line television system as claimed in claim 1, in which said means for reproducing the received signals includes means for deflecting a first reproducing scanning spot in line and field synchronism with the scanning spot at the transmitter, first wobble means for oscillating said first reproducing scanning spot in synchronism with and in phase with the wobble of the scanning spot at the transmitter and with the same wobble amplitude, and means for modulating said first reproducing scanning spot with the received signals; said synthesising means comprises means for delaying the received signals by the time of one picture element and means for combining the resultant delayed signals with the undelayed received signals, each at half strength, to produce resultant combination signals; and said means for reproducing the further signals comprises means for deflecting a second reproducing scanning spot in line and field synchronism with the scanning spot at the transmitter, second wobble means for oscillating said second reproducing scanning spot in synchronism with but in phase opposition to the wobble of the scanning spot at the transmitter, and means for modulating said second reproducing scanning spot with said resultant combination signals.

11. A television system as claimed in claim 10 wherein the two reproducing scanning spots are the scanning spots in two separate reproducer tubes, each reproducing its own picture, the two reproduced pictures being optically superimposed by optical projection systems to produce a composite picture for viewing.

12. A television system as claimed in claim 10 wherein the two reproducing scanning spots are produced in a single reproducer tube having an electron gun system producing two independently deflectable cathode ray beams, the two reproducing spots scanning the same fluorescent screen to produce a composite picture.

13. A television system as claimed in claim 10, in which said means for reproducing the received signals and said means for reproducing the further signals comprise a single beam reproducer cathode ray tube, means for subjecting the single beam of said tube to an auxiliary wobble deflection of amplitude corresponding to the wobble deflection employed at the transmitter, and means for applying modulating signals to modulate the beam at substantially only those times when it is at the top of the "crests" and the bottoms of the "valleys" of the auxiliary wobble.

14. A television system in accordance with claim 1, wherein said transmitting means includes means for providing double interlaced deflection of the transmitter scanning spot and means for oscillating the transmitter scanning spot during each line period excursion of a field with an amplitude such as to move it back and forth between two successive lines of that field, and wherein said means for reproducing the received signals includes means for deflecting a first reproducing scanning spot in line and field synchronism with the scanning spot at the transmitter, first wobble means for oscillating said first reproducing scanning spot in synchronism with and in phase with the wobble of the scanning spot at the transmitter and with the same wobble amplitude which is equal to the successive line spacing in one field, and means for modulating said first reproducing scanning spot with the received signals; said synthesising means comprises means for delaying the received signals by the time of one picture element and means for combining the resultant delayed signals with the undelayed received signals, each at half strength, to produce resultant combination signals; and said means for reproducing the further signals comprises means for deflecting a second reproducing scanning spot in line and field synchronism with the scanning spot at the transmitter, second wobble means for oscillating said second reproducing scanning spot in synchronism with but in phase opposition to the wobble of the scanning spot at the transmitter and with the same wobble amplitude, and means for modulating said second reproducing scanning spot with said resultant combination signals.

15. A television system as claimed in claim 14 wherein the two reproducing scanning spots are the scanning spots in two separate reproducer tubes, each reproducing its own picture, the two reproduced pictures being optically superimposed by optical projection systems to produce a composite picture for viewing.

16. A television system as claimed in claim 14 wherein the two reproducing scanning spots are produced in a single reproducing tube having an electron gun system producing two independently deflectable cathode ray beams, the two reproducing spots scanning the same fluorescent screen to produce a composite picture.

17. A television system as claimed in claim 14 and comprising a single beam reproducer cathode ray tube, means for subjecting the single beam of said tube to an auxiliary wobble deflection of amplitude corresponding to the wobble deflection employed at the transmittter, and means for applying modulating signals to modulate the beam at substantially only those times when it is at the top of the "crests" and the bottoms of the "valleys" of the auxiliary wobble.

18. A television system in accordance with claim 1 wherein said transmitting means includes means for providing double interlaced deflection of the transmitter scanning spot and means for oscillating the transmitter scanning spot during each line period excursion of a field with an amplitude such as to move it back and forth between two successive lines of that field.

19. A television system as claimed in claim 18 wherein the scanning spot oscillation frequency is approximately equal to the maximum modulation frequency of the system and is an odd harmonic of one quarter of the field frequency.

20. A television system as claimed in claim 18 wherein said means for oscillating includes a source of rectangular waveform.

21. A sequential line television system comprising: a transmitter having means for transmitting, during any one television field, signals corresponding to separate spaced picture elements, said transmitting means including wobble means for causing the scanning spot to oscillate during each line period excursion between two successive lines so that odd numbered picture element signals correspond to spaced picture elements in one of said two lines and even numbered picture element signals correspond to spaced picture elements in the other of said two lines, said spaced picture elements in each of the two lines being spaced apart by a picture element; and a co-operating receiver including means for receiving the transmitted signals, means for reproducing the received signals as separate spaced reproduced picture elements in the television field to which they are appropriate, synthesising means for deriving from successive received signals further signals of varying values dependent upon the varying values of said received signals, and means for reproducing said further signals as further separate spaced reproduced picture elements in the same television field in the spaces between the aforesaid spaced reproduced picture elements.

References Cited by the Examiner

UNITED STATES PATENTS

| | | | |
|---|---|---|---|
| 2,479,880 | 8/49 | Toulon | 178—6 |
| 2,810,780 | 10/57 | Loughlin | 178—6 |
| 2,902,540 | 9/59 | Sarson | 178—6.8 |
| 2,921,124 | 1/60 | Graham | 178—6 |
| 2,939,909 | 6/60 | Toulon | 178—7.5 |
| 2,942,145 | 6/60 | Sleeper | 178—5.4 |
| 3,051,778 | 8/62 | Graham | 178—6 |

DAVID G. REDINBAUGH, *Primary Examiner.*

ELI J. SAX, *Examiner.*